(No Model.)
A. J. POLK.
BICYCLE SUPPORT.
No. 558,103.  Patented Apr. 14, 1896.
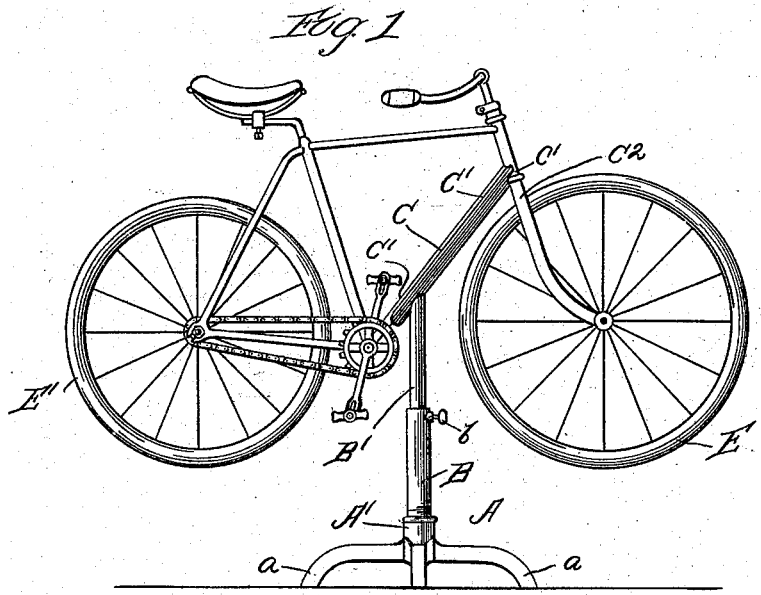
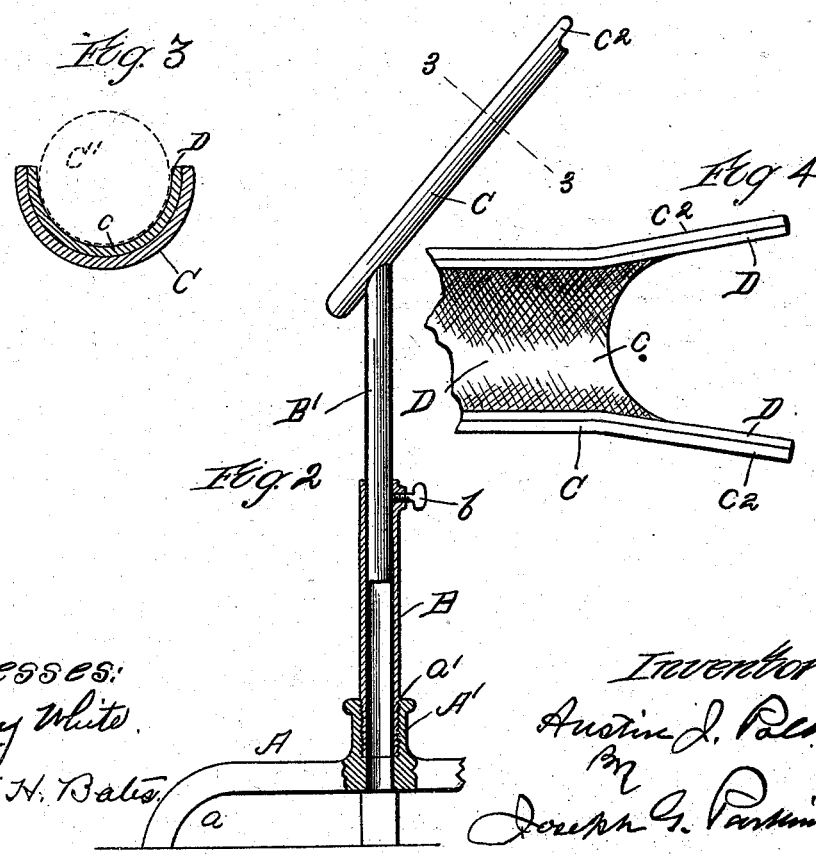
Witnesses:
Harry White
Albert H. Bates
Inventor:
Austin J. Polk
By
Joseph G. Parkinson
Atty.

UNITED STATES PATENT OFFICE.

AUSTIN J. POLK, OF CHICAGO, ILLINOIS.

BICYCLE-SUPPORT.

SPECIFICATION forming part of Letters Patent No. 558,103, dated April 14, 1896.

Application filed October 3, 1894. Serial No. 524,805. (No model.)

*To all whom it may concern:*

Be it known that I, AUSTIN J. POLK, a citizen of the United States, residing in Chicago, county of Cook, State of Illinois, have invented certain new and useful Improvements in Bicycle-Supports, of which the following is a specification.

The object of my invention is to provide a simple and convenient support in the nature of a "jack" for the ordinary purposes of "stabling" and equally adapted for the house, the club, and the workshop, upon which the machine shall be borne with the tread of its wheels clear of the ground or floor and at any suitable or desirable height thereabove; and the invention consists in the combination, with a standard having any appropriate base, of a seat carried at the upper end of said standard and of such outline as to conform to the lower bar of the frame of the machine between the wheels thereof (the brace-bar of a "men's safety" or the backbone of a "standard" or of a "women's safety") and at its upper end to engage with the steering-head or the lower bearing thereof and take over the top of the steering-fork.

In the drawings, Figure 1 is a side elevation of a support or jack embodying my invention with a bicycle of the type known as "men's safety" mounted thereon. Fig. 2 is an elevation, partly in section, of said support enlarged over the scale of the preceding figure. Fig. 3 is an enlarged detail on the correspondingly-numbered line in Fig. 2, and Fig. 4 is an enlarged detail of the upper end of the support seen from above.

A represents the base of the support, shown herein as formed with feet $a$, outsetting from a central hub A', which has a screw-threaded socket $a'$ for the reception of the lower tubular member B of the telescoping standard when the support is to be adjustable or of the integral standard itself when adjustability is not an object. Within the tube slides up and down the second member B', which for lightness may also be tubular or hollow and will be secured at any desired adjustment to regulate the height at which the bicycle is to be supported by any suitable locking or clamping device—as, for instance, the clamping-screw $b$. (Shown herein as an exponent of such securing or fastening agent.)

To the upper end of the standard, or the upper end of the upper member thereof, is secured the seat C, having a longitudinal outline conforming to the outline of the frame-bar which it is intended to receive—in the present instance, the brace-bar C' of a men's safety—and preferably cupped or concave in cross-section, as at $c$ in Fig. 3, to embrace the lower side of such bar. At its upper or forward end the seat is cut away to receive the steering-head of the bicycle or the lower bearing $c'$ thereof and to form two forks $c^2$, which pass one on each side of such head or bearing and take over the top of the steering-fork $C^2$, thus steadying the machine against lateral movement. The seat will be lined with leather D or other cushioning material to prevent abrasion of the part or parts it supports.

With this construction it is evident that when the machine is lifted into place it will slide home and lock itself and cannot be disengaged without an oblique lifting movement; that it will be held at a convenient height for "grooming" or other operations, and that both the front wheel E and the rear wheel E' will be free to be revolved to bring one part or another uppermost.

It is evident that by forming a jog in the standard and changing the inclination of the seat the support may be applied to the backbone of a safety of the type herein shown, and such I consider within the principle of my invention.

I claim—

1. A bicycle-support consisting of a suitable standard carrying an elongated seat adapted to receive the lower forward member of a bicycle-frame, and means at the upper end of the seat for engaging and preventing the forward wheel and fork from turning or tilting when the frame is slid down into the seat until the forked crown is stopped by the upper end of the seat, substantially as described.

2. A bicycle-support consisting of a suitable standard supported by a base and provided with a seat located in an inclined position and having a longitudinal recess on its upper side whereby it is adapted to engage the frame-bar of the bicycle, said seat provided on its upper end with means for engaging the steering head or fork of the bicycle, consisting of a notch or recess in the end of the seat, said recess forming a seat into which the steering-head drops, substantially as described.

AUSTIN J. POLK.

Witnesses:
JOSEPH G. PARKINSON,
FLORENCE KING.